United States Patent
Cho et al.

(10) Patent No.: US 10,104,579 B1
(45) Date of Patent: Oct. 16, 2018

(54) USER EQUIPMENT AND FLEXIBLE PROTOCOL DATA UNIT PACKAGING METHOD THEREOF

(71) Applicant: MEDIATEK INC., Hsinchu (TW)

(72) Inventors: Te-Chung Cho, Taichung (TW); Yu-Ting Chen, Chiayi County (TW); Chao-Ming Wu, New Taipei (TW)

(73) Assignee: MEDIATEK INC., Hsinchu (TW)

( * ) Notice: Subject to any disclaimer, the term of this patent is extended or adjusted under 35 U.S.C. 154(b) by 23 days.

(21) Appl. No.: 15/486,641

(22) Filed: Apr. 13, 2017

(51) Int. Cl.
| | |
|---|---|
| *H04W 28/06* | (2009.01) |
| *H04L 29/06* | (2006.01) |
| *H04L 12/805* | (2013.01) |
| *H04W 80/02* | (2009.01) |

(52) U.S. Cl.
CPC .......... *H04W 28/065* (2013.01); *H04L 47/36* (2013.01); *H04L 69/22* (2013.01); *H04W 80/02* (2013.01)

(58) Field of Classification Search
None
See application file for complete search history.

(56) References Cited

U.S. PATENT DOCUMENTS

| | | | | |
|---|---|---|---|---|
| 7,295,573 B2 * | 11/2007 | Yi | ........................... | H04L 47/10 370/469 |
| 8,705,406 B2 * | 4/2014 | Pani | ....................... | H04L 1/1877 370/254 |
| 9,019,901 B2 * | 4/2015 | Lee | ........................ | H04W 28/06 370/329 |
| 2002/0024972 A1 | 2/2002 | Yi et al. | | |
| 2002/0174276 A1 * | 11/2002 | Jiang | ...................... | H04W 28/06 710/105 |
| 2006/0007952 A1 * | 1/2006 | Oishi | .................... | H04W 28/06 370/465 |
| 2006/0251105 A1 * | 11/2006 | Kim | ....................... | H04L 1/1685 370/449 |
| 2007/0097913 A1 * | 5/2007 | Hanov | ................... | H04L 1/0045 370/329 |
| 2013/0044698 A1 * | 2/2013 | Susitaival | ............. | H04W 28/06 370/329 |

* cited by examiner

*Primary Examiner* — Brian Roberts
(74) *Attorney, Agent, or Firm* — McClure, Qualey & Rodack, LLP

(57) ABSTRACT

A user equipment (UE) and a flexible protocol data unit (PDU) packaging method thereof are provided. The user equipment performs a flexible PDU packaging procedure in a radio link control (RLC) layer when receiving configuration information that configures a 7-bit length indicator (LI) size and a flexible PDU size from a base station. The user equipment uses an exactly-filled LI to indicate the end of a service data unit (SDU) occurring at the end of the previous one PDU and an accumulated SDU size of the previous one PDU exceeds 123 octets. In addition, the user equipment utilizes a special value of a header extension (HE) field or an alternative E-bit of the header to indicate that the PDU includes only one SDU and the SDU is a complete SDU.

18 Claims, 14 Drawing Sheets

Example I

Example II

USER EQUIPMENT AND FLEXIBLE PROTOCOL DATA UNIT PACKAGING METHOD THEREOF

CROSS-REFERENCES TO RELATED APPLICATIONS

Not applicable.

BACKGROUND OF THE INVENTION

Field of the Invention

The present invention relates to a user equipment (UE) and a flexible protocol data unit (PDU) packaging method thereof. More particularly, the UE of the present invention uses an exactly-filled length indicator (LI), a special value of a header extension (HE) field or an alternative E-bit of the header to indicate the end of a service data unit (SDU) when the UE is configured to use a 7-bit LI size and a flexible PDU size in a radio link control (RLC) layer (e.g., NOTE 1 and NOTE 2 described in the section 8.5.21 of the 3GPP TS 25.331 version 11.14.0 specification).

Descriptions of the Related Art

With the development of wireless communication technologies, user equipment (UEs) have been widely used to transmit text messages, to make a phone call or the like. To satisfy users' overwhelming demands for communication, various telecommunication standards have been developed. For example, $3^{rd}$ Generation Partnership Project (3GPP) communication system is one of the most widely used communication system around many countries.

In the 3GPP communication system, the section 8.5.21 of the 3GPP TS 25.331 version 11.14.0 specification describes two notes (i.e., NOTE 1 and NOTE 2) regarding the UTRAN (UMTS Terrestrial Radio Access Network) sets the uplink RLC to "flexible size". NOTE 1 states the UE's behavior is unspecified if the UTRAN has configured "Flexible size" RLC PDUs and the 7-bit "Length indicator (LI) size" field and "Largest UL RLC PDU size">126 octets, but the UTRAN has not configured "Use special value of header extension (HE) field". NOTE 2 states the UE's behavior is also unspecified if the UTRAN has configured "Flexible size" RLC PDUs and the 7-bit "Length indicator (LI) size" field, but the UTRAN has also configured "Minimum UL RLC PDU size">126 octets. Under the circumstances stated in NOTE 1 and NOTE 2, when UE transmits the packaged RLC PDU with a SDU whose end is located beyond 123 octets of the SDU/SDUs in the PDU to a receiving end (e.g., the base station, or another UE), the receiving end may be unable to retrieves each SDU from the packaged PDU accurately.

Accordingly, an urgent need exists in the art to provide a RLC PDU packaging rule specifying the UE's behavior under the circumstances stated in NOTE 1 and NOTE 2.

SUMMARY OF THE INVENTION

The objective of the present invention is to provide a protocol data unit (PDU) packaging rule in a radio link control (RLC) layer to specify the UE's behavior under the circumstances stated in NOTE 1 and NOTE 2 (which is not limited to an acknowledged (AM) mode or an unacknowledged (UM) mode) so that UEs could utilize a 7-bit sized LI, a special HE and/or an alternative E-bit to indicate the ends of SDUs in flexible sized PDUs.

To achieve the aforesaid objective, the present invention discloses a user equipment which comprises a transceiver and a processor electrically connected to the transceiver. The transceiver is configured to receive configuration information from a base station. The processor is configured to perform a flexible protocol data unit (PDU) packaging procedure in a radio link control (RLC) layer when the configuration information configures a 7-bit length indicator (LI) size and a flexible PDU size. The first flexible PDU packaging procedure comprises the following steps: (a) generating a PDU of the RLC layer; (b) filling a service data unit (SDU) into the PDU; (c) calculating an accumulated SDU size of the PDU; (d) determining whether the accumulated SDU size is larger than 123 octets; (e) filling a next SDU into the PDU when the accumulated SDU size is not larger than 123 octets; (f) repeating the steps (c) to (e) until the accumulated SDU size is larger than 123 octets; (g) after the step (f), determining whether the PDU includes only the SDU and the SDU is a complete SDU; (h) setting a header extension (HE) field or an alternative E-bit of the header of the PDU to a special value to indicate the SDU is the complete SDU when the PDU includes only the SDU and the SDU is the complete SDU if the configuration information configures a special HE or an alternative E-bit interpretation; and (i) finishing packaging the PDU.

In addition, the present invention further discloses a flexible protocol data unit (PDU) packaging method in a radio link control (RLC) layer. The PDU packaging method is for used in a user equipment which comprises a transceiver and a processor electrically connected to the transceiver. The transceiver is configured to receive a configuration information from a base station. The PDU packaging method is executed by the processor when the configuration information configures a 7-bit length indicator (LI) size and a flexible PDU size and comprises the following steps: (a) generating a PDU of the RLC layer; (b) filling a service data unit (SDU) into the PDU; (c) calculating an accumulated SDU size of the PDU; (d) determining whether the accumulated SDU size is larger than 123 octets; (e) filling a next SDU into the PDU when the accumulated SDU size is not larger than 123 octets; (f) repeating the steps (c) to (e) until the accumulated SDU size is larger than 123 octets; (g) after the step (f), determining whether the PDU includes only the SDU and the SDU is a complete SDU; (h) setting a header extension (HE) field or an alternative E-bit of the header of the PDU to a special value to indicate the SDU is the complete SDU when the PDU includes only the SDU and the SDU is the complete SDU if the configuration information configures a special HE or an alternative E-bit interpretation; and (i) finishing packaging the PDU.

Besides, the present invention further discloses a user equipment which comprises a transceiver and a processor electrically connected to the transceiver. The transceiver is configured to receive configuration information from a base station. The processor is configured to perform a flexible PDU packaging procedure according to a system setting when the configuration information configures a 7-bit LI size and a flexible PDU size, and the flexible PDU packaging procedure comprises the following steps: (a) generating a PDU of the RLC layer; (b) filling an SDU into the PDU, wherein the SDU is a complete SDU with a SDU size being smaller than or equal to 123 octets, or the SDU is a segmented SDU with the SDU size being larger than 123 octets if the SDU is not a last segment of an original SDU of the SDU or with the SDU size being smaller than or equal to 123 octets if the SDU is the last segment of an original SDU; (c) calculating an accumulated SDU size of the PDU; (d) determining whether the accumulated SDU size is smaller than 123 octets; (e) filling a next SDU into the PDU when the accumulated SDU size is smaller than 123 octets, wherein the next SDU is the segmented SDU when an original SDU of the next SDU makes the accumulated SDU size be larger than 123 octets, or the next SDU is a complete SDU and does not make the accumulated SDU size be larger than 123 octets; (f) repeating the steps (c) to (e) unless the accumulated SDU size is not smaller than 123 octets; (g) after the step (f), filling at least one 7-bit LI into the PDU when the next SDU is filled into the PDU, and filling a header into the PDU; and (h) finishing packaging the PDU.

Besides, the present invention further discloses a user equipment which comprises a transceiver and a processor electrically connected to the transceiver. The transceiver is configured to receive configuration information from a base station. The processor is configured to perform a fixed PDU packaging procedure according to a system setting when the configuration information configures a 7-bit LI size and a flexible PDU size, and the fixed PDU packaging procedure comprises the following steps: (a) generating a PDU of the RLC layer; (b) filling an SDU into the PDU, wherein the SDU is a segmented SDU and has 123 octets when an original SDU of the SDU has more than 123 octets; (c) calculating an accumulated SDU size of the PDU; (d) determining whether the accumulated SDU size is smaller than 123 octets; (e) filling a next SDU into the PDU when the accumulated SDU size is smaller than 123 octets, wherein the next SDU is a segmented SDU and makes the accumulated SDU size be equal to 123 octets, or the next SDU is a complete SDU and does not make the accumulated SDU size be larger than 123 octets; (f) repeating the steps (c) to (e) until the accumulated SDU size is equal to 123 octets; (g) after the step (f), filling at least one 7-bit LI into the PDU when the next SDU is filled into the PDU, and filling a header into the PDU; and (h) finishing packaging the PDU.

Besides, the present invention further discloses a user equipment which comprises a transceiver and a processor electrically connected to the transceiver. The transceiver is configured to receive configuration information from a base station. The processor is configured to perform a flexible PDU packaging procedure according to a system setting when the configuration information configures a 7-bit LI size and the flexible PDU size, and a second flexible PDU packaging procedure comprises the following steps: (a) generating a PDU of the RLC layer; (b) filling an SDU into the PDU, wherein the SDU is a segmented SDU and has 123 octets when an original SDU of the SDU has more than 123 octets; (c) calculating an accumulated SDU size of the PDU; (d) determining whether the accumulated SDU size is smaller than 123 octets; (e) filling a next SDU into the PDU when the accumulated SDU size is smaller than 123 octets and the next SDU does not make the accumulated SDU size be larger than 123 octets; (f) repeating the steps (c) to (e) unless the next SDU is a complete SDU and is not filled into the PDU in the step (e) or the next SDU is a segmented SDU and has been filled in the step (e); (g) after the step (f), filling at least one 7-bit LI into the PDU when the next SDU is filled into the PDU, and filling a header into the PDU; and (h) finishing packaging the PDU.

Besides, the present invention further discloses a user equipment which comprises a transceiver and a processor electrically connected to the transceiver. The transceiver is configured to receive configuration information from a base station. The processor is configured to perform a disconnection procedure according to a system setting when the configuration information configures a 7-bit LI size and a flexible PDU size, and the disconnection procedure comprises the following step: transmitting an invalid configuration message to the base station.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention provides a user equipment (UE) and a flexible protocol data unit (PDU) packaging method thereof. In the following description, the present invention will be explained with reference to embodiments thereof. It shall be appreciated that theses embodiments of the present invention are not intended to limit the present invention to any specific environment, applications or implementations described in these embodiments. Therefore, the description of these embodiments is only for purpose of illustration rather than to limit the present invention and the scope claimed in this application shall be governed by the claims. Additionally, in the following embodiments and the attached drawings, elements unrelated to the present invention are omitted from depiction; and dimensional relationships among individual elements in the attached drawings are illustrated only for ease of understanding, but not to limit the actual scale.

Figure 1:
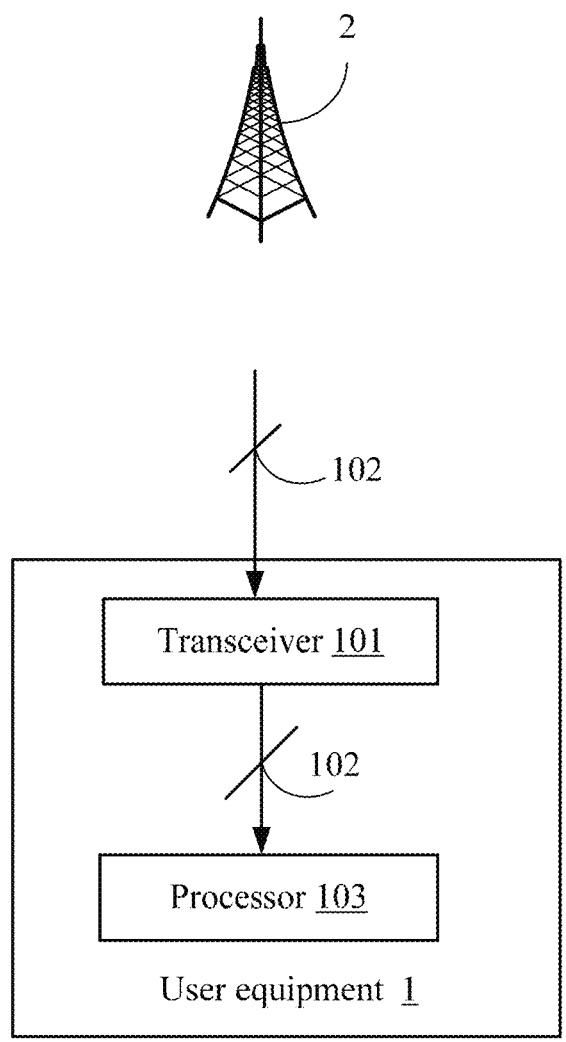
FIG. 1 a schematic view of a user equipment 1 according to the first embodiment to the second embodiment of the present invention.

The first embodiment of the present invention is depicted in FIGS. 1, 2, 3A-3D. FIG. 1 is a schematic diagram of a UE 1 of the present invention. The UE 1 may be a smart phone, a tablet computer, or any other device with communication capability. It shall be noted that for the purpose of simplicity, other elements of the UE 1, such as a display module, an antenna module, a power module and elements less related to the present invention, are all omitted from depiction herein.

As shown in FIG. 1, the UE 1 of the present invention comprises a transceiver 101 and a processor 103. The transceiver 101 is configured to receive configuration information 102 from a base station 2. In detail, the base station 2 of the present invention may be regulated under $3^{rd}$ Generation Partnership Project (3GPP) telecommunication system. And, the base station 2 transmits the configuration information 102 to inform the UE 1 of information about an operation mode (e.g., acknowledged mode or unacknowledged mode, flexible size of protocol data units (PDU) of radio link control (RLC) or fixed size of PDU of RLC, the size of the length indicator (LI) and so on).

The processor 103 is electrically connected to the transceiver 101 and configured to perform a first flexible PDU packaging procedure in the RLC layer when the configuration information 102 configures a 7-bit LI size and a flexible PDU size. In other words, the UE 1 can be configured to execute the first flexible PDU packaging procedure according to a system setting once the configuration information 102 informs the user equipment 1 of using 7-bit sized LIs to indicate each end of the service data unit (SDU)/SDUs in the flexible PDU. When the base station 2 configures flexible size of RLC PDUs to the UE 1, it means that the UE 1 operates in a mode in which the RLC PDUs are packaged in a variety of sizes, hereinafter called the flexible PDU packaging mode for purpose of ease of description.

In detail, the base station 2 defines a minimum RLC PDU size and a maximum RLC PDU size for the flexible PDU packaging mode. In the present invention, the size of the packaged PDU size cannot exceed the maximum RLC PDU size defined in the configuration information 102, but may be less than the minimum RLC PDU size. In other words, the minimum RLC PDU size is not a limitation in the present application; thus, the main contents of the present invention will focus on the case that the maximum RLC PDU size or the minimum RLC PDU size is configured to be larger than 126 octets in an acknowledged (AM) mode and larger than 125 octets in an unacknowledged (UM) mode, which meets the circumstances stated in both NOTE 1 and NOTE 2. The flexible PDU packaging procedure of the first embodiment will be further described thoroughly as below.

First, the processor 103 generates a PDU of the RLC layer in order to fill SDUs into the PDU of the RLC layer. Then, the processor 103 fills a SDU into the PDU. Specifically, the processor 103 determines whether the SDU has been generated, and fills the SDU into the PDU when the SDU has been generated. It shall be understood that the present invention focuses on the packaging of PDU of RLC layer, and "the SDU has been generated" described herein means that the SDU has been received from the upper layer. When the SDU has not been generated, the first flexible PDU packaging procedure will be terminated, and will be re-performed when there is a new SDU having been generated.

After filling the SDU into the PDU, the processor 103 further calculates an accumulated SDU size of the PDU, determines whether the accumulated SDU size is larger than 123 octets or not, and fills a next SDU into the PDU when the accumulated SDU size is not larger than 123 octets. For example, the base station 2 may define a maximum RLC PDU size carried in the configuration information 102 as 180 octets. In this case, the UE 1 can package a variety of sizes of PDUs as long as the packaging size of PDU is not larger than 180 octets (i.e., a maximum RLC PDU size defined by the configuration information 102). In order to maximize the generated PDU size, the UE 1 of the present invention would repeat the aforesaid steps (i.e., calculating an accumulated SDU size of the PDU, determining whether the accumulated SDU size is larger than 123 octets, and filling a next SDU into the PDU when the accumulated SDU size is not larger than 123 octets) until the accumulated SDU size is larger than 123 octets.

It shall be appreciated that since the header occupies 2 bytes in the AM mode and occupies 1 byte in the UM mode, the generated PDU size would be larger than 126 octets in the AM mode and 125 octets in the UM mode when the accumulated SDU size is larger than 123 octets. Therefore, the present invention determines when to stop filling a next SDU into the PDU based on whether the accumulated SDU size is larger than 123 octets.

Figure 2:
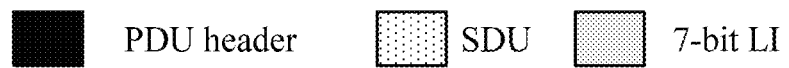
FIG. 2 is a schematic diagram showing two exemplary implementations to depict how to fill SDUs into a PDU according to the first embodiment of the present invention.
Figure 2:
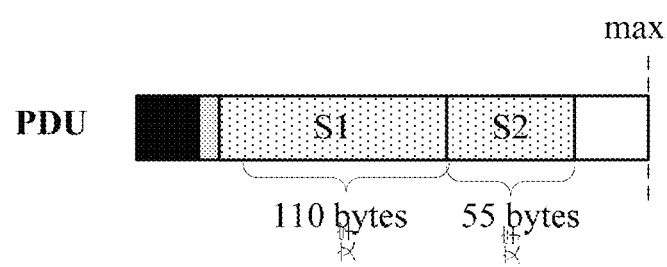
Figure 2:
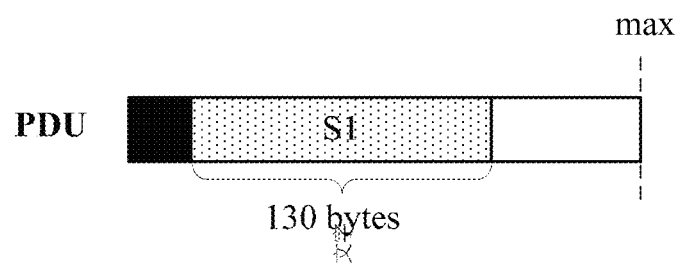

For example, as shown in Example I of FIG. 2, it is assumed that the processor 103 fills a first SDU S1 with 110 octets into the generated PDU. Since the accumulated SDU size of the PDU is 110 octets, which is smaller than 123 octets, the processor 103 further fills a second SDU S2 with 55 octets into the PDU. Now, the accumulated SDU size is 165 octets larger than 123 octets, and thus the processor 103 would not further fill a next SDU into this PDU.

As aforementioned, each time the processor 103 is going to fill another new SDU into the PDU, the processor 103 would determine whether the new SDU has been generated, and fill the new SDU into the PDU when the new SDU has been generated. Example II of FIG. 2 shows the case that the processor 103 finishes packaging the PDU and ends up the first flexible PDU packaging procedure when there is no another new SDU being generated.

Further, after the accumulated SDU size is larger than 123 octets, the processor 103 determines whether the PDU includes only one SDU and the SDU is a complete SDU (which is not segmented, concatenated or padded). If the PDU includes only one SDU and the SDU is complete, then the processor 103 may set a header extension (HE) field to a special value (e.g., "10") to indicate the SDU is a complete SDU if the UTRAN has configured "Use special value of HE field" (hereinafter also called "special HE"). Besides, the processor 103 may set an alternative E-bit of the header of the PDU to a special value (e.g., "0") to indicate the SDU is a complete SDU if the UTRAN has configured "Alternative E-bit interpretation". Specifically, the processor 103 may set the HE field or the alternative E-bit of the header of the PDU to the special value according to the configuration information 102, which informs the UE 1 of the connection mode (i.e., an AM mode or an UM mode), the E-bit interpretation (i.e., the normal E-bit interpretation or the alternative E-bit interpretation) and the use of special value of HE field.

Specifically, if the connection between the user equipment 1 and the base station 2 is established under the AM mode, the processor 103 may set the HE field of the PDU to the special value (e.g. "10"). Otherwise, the processor 103 would set the alternative E-bit of the header of the PDU to the special value (e.g., "0") when the connection is established under UM mode and the alternative E-bit interpretation is configured. By using the special value of the HE field or the alternative E-bit of the header, an end of the SDU at the end of the PDU can be indicated and recognized. Consequently, the processor 103 finishes packaging the PDU. It shall be noted that the length of the alternative E-bit is 1 bit, while the length of the HE field is 2 bits.

For example, as shown in Example II of FIG. 2, when the processor 103 fills a first SDU S1 with 130 octets, which is larger than 123 octets, the PDU would not be further filled with a next SDU. In this case, based on the configuration information 102, the processor 103 may set the HE field or the alternative E-bit of the header to the special value since the PDU includes only one SDU S1 and the SDU S1 is also a complete SDU. Accordingly, the end of SDU S1 can be indicated by the special value of the HE field or the alternative E-bit of the header. However, if the UTRAN has not configured "Use special value of HE field" or the "Alternative E-bit interpretation", the processor 103 will fill an exactly-filled LI into the next PDU to indicate that an end of a SDU is at the end of the previous PDU and the detail of the exactly-filled LI will be described later.

When the processor 103 determines that the PDU includes more than one SDU after the accumulated SDU size is larger than 123 octets (e.g., Example I of FIG. 2), the UE 1 of the present invention would use the 7-bit LI and/or an exactly-filled LI to indicate the end of the SDUs. Specifically, the processor 103 sets an exactly-filled flag as "true" when the PDU includes more than one SDU and a last filled SDU is also a complete SDU (that is, the end of the last filled SDU is at the end of the PDU). Then, the processor 103 fills at least one 7-bit LI and a header into the PDU. Consequently, the processor 103 finishes packaging the PDU.

The number of the filled 7-bit LI depends on how many ends of the SDUs there are within the first 123 octets of the SDUs. For example, as shown in Example I of FIG. 2, the end of SDU S1 is within the first 123 octets of the SDUs (i.e., SDUs S1 and S2); thus, the processor 103 fills one 7-bit LI into the PDU to indicate the end of the SDU S1.

In addition, the processor 103 also sets the exactly-filled flag as "true" when the PDU is exactly filled with the last segment of an SDU and there is no LI that indicates the end of the SDU in the current PDU. For example, the original SDU has two segmented SDUs, one is filled into the previous PDU and the other is filled into the current PDU. Since the segmented SDU in the current PDU has more than 123 octets and has an end at the end of the current PDU, the processor 103 sets the exactly-filled flag as "true" so that there will be an exactly-filled LI filled into the next PDU to indicate the end of the segmented SDU.

As aforementioned, the exactly-filled LI is used to indicate that an end of a SDU is at the end of the previous one PDU. Thus, if a first PDU includes a last filled SDU whose end is at the end of the first PDU and makes the accumulated SDU size of the first PDU be larger than 123 octets, the UE 1 of the present invention would set the exactly-filled flag as "true" firstly, and then fill an exactly-filled LI into the next PDU (i.e., the second PDU) to indicate that the end of the previous one PDU (i.e., first PDU) is the end of a SDU. On the other hand, in the UTRAN has not configured "Use special value of HE field" or the "Alternative E-bit interpretation" and the PDU includes only one complete SDU (e.g., Example II of FIG. 2), the UE 1 of the present invention would fill an exactly-filled LI into the next PDU to indicate that the end of the previous one PDU is the end of a SDU.

Hence, after finishing the first PDU packaging, the processor 103 would repeat the aforesaid steps to package another new PDU. In fact, each time after the processor 103 generates a new PDU of the RLC layer to be filled with a SDU or SDUs, the processor 103 would determines whether the exactly-filled flag is set as "true", and fills an exactly-filled LI into the PDU when the exactly-filled flag is set as "true". Afterwards, the processor 103 sets the exactly-filled flag as "false" once the exactly-filled LI has been filled into the PDU. Accordingly, an end of a SDU located beyond the first 123 octets of the filled SDUs is able to be indicated by the exactly-filled LI.

FIGS. 3A to 3D are various implementations for the first embodiment of the present invention. In these implementations, the maximum RLC PDU size is larger than 126 octets as NOTE 1, and the minimum RLC PDU size would be less than 126 octets, or larger than 126 octets as NOTE 2.

Figure 3A:
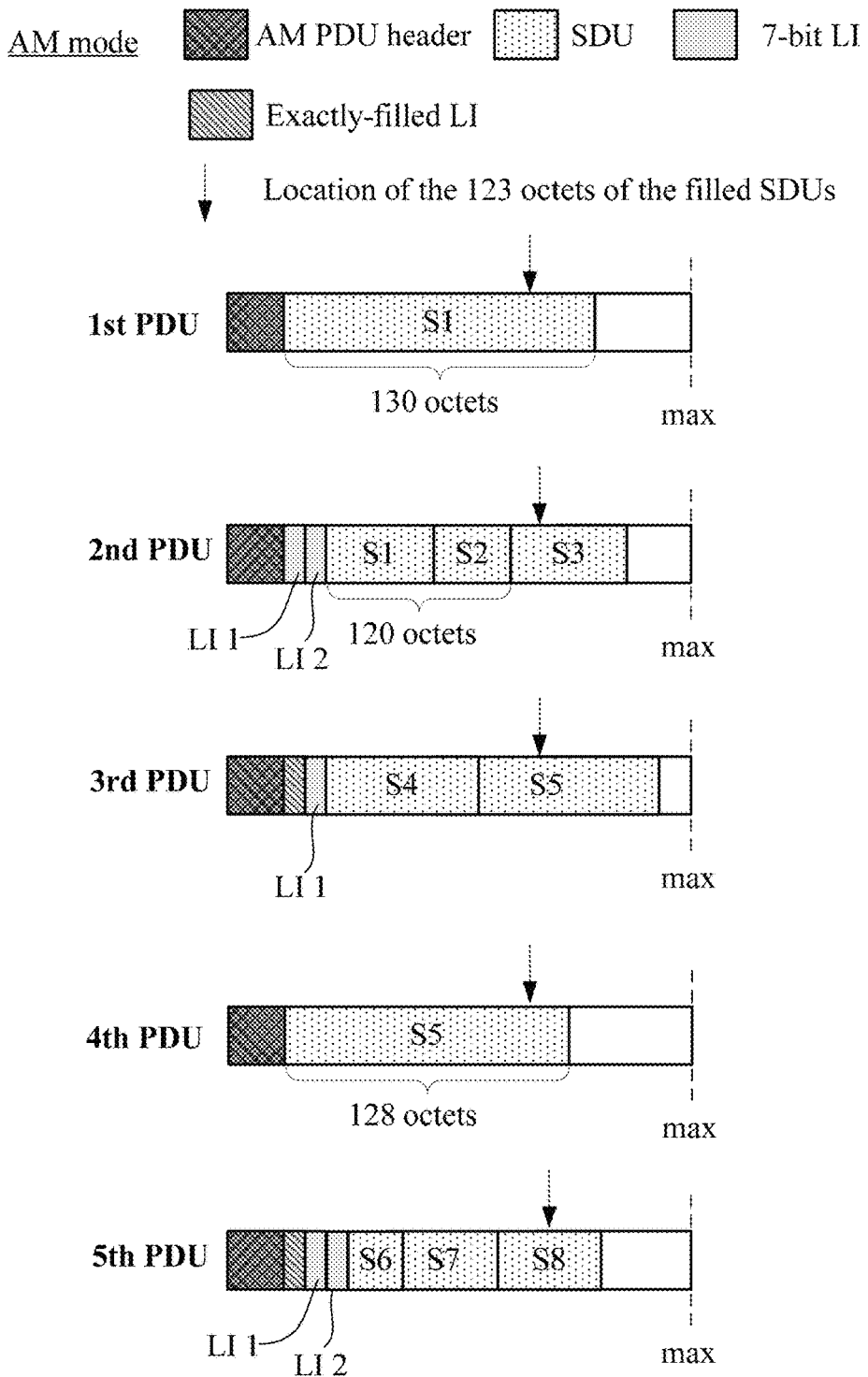
FIG. 3A-3D are schematic diagrams illustrating exemplary implementations of PDU packaging according to the first embodiment of the present invention.

FIG. 3A shows an exemplary implementation of the flexible PDU packaging in AMD. First, the UE 1 fills a 130-byte SDU S1 into the first PDU. Since the SDU S1 is not a complete SDU in the first PDU, which means there is no end of the SDU S1 in the first PDU, the first PDU is only filled with an AM PDU header. Next, the UE 1 continues to fill a remaining part of the SDU S1 and a SDU S2 into the second PDU, and uses a first LI1 and a second LI 2 to indicate the ends of the SDU S1 and SDU S2, respectively. In detail, the first LI 1 and the second LI 2 are normal LI (i.e., 7-bit LI).

In addition, it shall be understood that each time the processor 103 fills a SDU into a PDU, an accumulated SDU size is determined, and the processor 103 continues to fill another new SDU if the accumulate SDU size is not larger than 123 octets. After filling the SDU S2 into the second PDU, the accumulated SDU size (i.e., S1 plus S2) is 120 octets, which is not larger than 123 octets. Hence, the UE 1 continues to fill a SDU S3 into the second PDU.

In this case, since the end of the SDU S3 located at the end of the second PDU makes the accumulate SDU length exceed 123 octets, the UE 1 uses an exactly-filled LI filled into the third PDU to indicate that the end of the SDU S3 is at the end of the second PDU. It should be noticed that in the present invention, since the SDU S3 is completely filled into the second PDU, the packaged PDU size of the second PDU may be less than the minimum RLC PDU size which is larger than 126 octets as NOTE 2.

Then, the UE 1 continues to fill the SDU S4 and a part of the SDU S5 to make the total length of the SDUs in the third PDU larger than 123 octets. In the case that the minimum RLC PDU size is configured to be larger than 126 octets as NOTE 2, the processor 103 would segment the SDU S5 (which is too large to be filled into the third PDU) and fill the segmented SDU S5 into the third PDU to make the size of the packaged third PDU larger than the minimum RLC PDU size but less than the maximum RLC PDU size, especially approximate to the maximum RLC PDU size as far as possible.

Next, the UE 1 fills the remaining part of the SDU S5 whose size (e.g., 128 octets) is larger than 123 octets into the fourth PDU. There is only a PDU header filled into the fourth PDU since the 7-bit LI is unable to indicate an end of the SDU S5 which exceeds the 123 octets. As a result, an exactly-filled LI is filled into the fifth PDU to indicate that the end of the SDU S5 is at the end of the fourth PDU. Afterwards, the other SDUs S6 to S8 are filled into the fifth PDU and a first LI 1 and a second LI 2 of the fifth PDU are used to indicate the ends of SDU S6 and S7, respectively, whose ends are within the first 123 octets of the filled SDUs in the fifth PDU.

Afterwards, the UE 1 will fill an exactly-filled LI or a 7-bit LI into the later PDU to indicate an end of the SDU S8 according to its end position. In addition, there are only first to fifth PDU illustrated herein to depict the present invention; however, those of ordinary skill in the art could appreciate that the UE 1 would continue to execute the first flexible PDU packaging procedure if there is space for the UE 1 to generate RLC PDUs for transmission in the current transmission time interval (TTI) (i.e., on-the-fly generation) or pre-generate RLC PDUs for transmission in a later transmission time interval (TTI). It shall be understood that whether RLC PDUs could be pre-generated depends on the amount of data in outstanding pre-generated RLC PDU for the logical channel. Since how the UE pre-generates RLC PDU based on the amount of data in outstanding pre-generated RLC PDU for the logical channel has already been appreciated by those of ordinary skill in the art, it will not be further described herein.

Figure 3B:
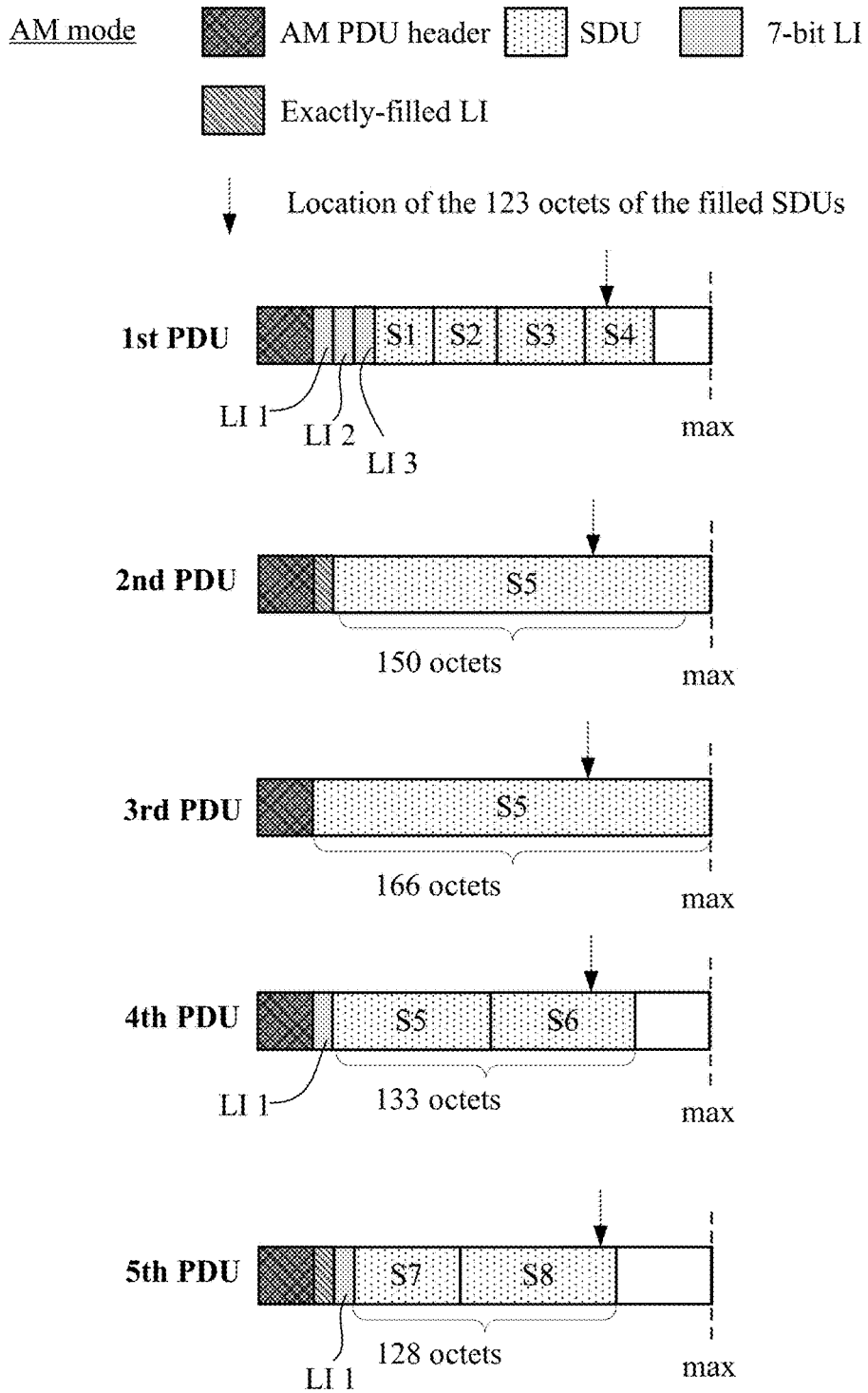

FIG. 3B shows another exemplary implementation of the flexible PDU packaging in AM mode. First, the UE 1 uses three 7-bit LIs (i.e., LI 1, LI 2, LI 3 of the first PDU) to indicate ends of SDUs S1, S2, S3, respectively, since all of their ends are within the first 123 octets of the filled SDUs in the first PDU. Next, a complete SDU S4 is further filled into the first PDU and an exactly-filled LI is filled into the second PDU to indicate that an end of the SDU S4 is at the end of the first PDU.

Afterwards, because the size of the SDU S5 is so large, the UE 1 has to use the second PDU, the third PDU and a part of the fourth PDU to fill the SDU S5. In this case, the processor 103 segments the SDU S5, and fills the first two segmented SDU S5 into the entire second PDU and the entire third PDU to make the sizes of the packaged second and third PDUs approximate to the maximum RLC PDU size as far as possible (e.g., equal to the maximum RLC PDU size or be less one octet than the maximum RLC PDU size). Based on the flexible PDU packaging mode in this embodiment, the UE 1 can package a various sizes of PDUs as long as the size of the packaged PDU is not larger than the maximum RLC PDU size defined in the configuration information 102.

Next, the UE 1 continues to fill a SDU S6 into the fourth PDU and utilizes an exactly-filled LI filled into the fifth PDU to indicate an end of the SDU S6. And, other generated SDUs S7, S8 are filled into the fifth PDU and an LI 1 of the fifth PDU is used to indicate an end of the SDU S7 (e.g., at the location of the 100 octets of the filled SDUs in the fifth PDU). Likewise, the user equipment 1 will fill an exactly-filled LI or a 7-bit LI into the later PDU to indicate an end of the SDU S8 according to its end position.

Figure 3C:
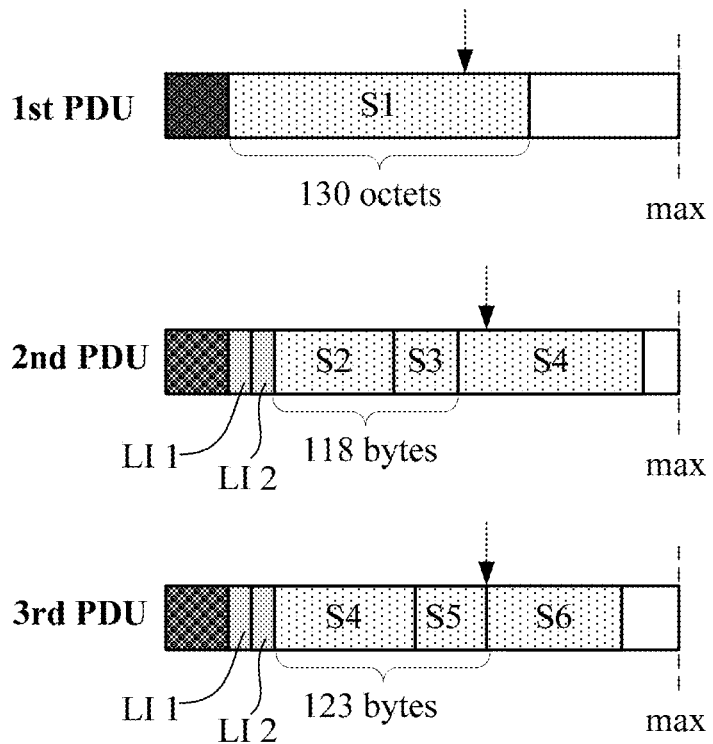

Moreover, FIG. 3C shows another exemplary implementation of the flexible PDU packaging in AM mode, in which the special HE is configured. For purpose of ease of description, there are only three PDUs illustrated herein to depict the exemplary implementation. First, a complete SDU S1 is filled into the first PDU and a special HE is utilized to indicate that the first PDU includes only one SDU (i.e., S1) and an end of the SDU S1 is located at the end of the first PDU. It shall be appreciated, in another exemplary implementation in which the special HE is not configured, an exactly-filled LI would be filled into the second PDU.

Next, SDUs S2, S3 and S4 are filled into the second PDU and an LI 1 and an LI 2 of the second PDU are used to indicate ends of the SDUs S2 and S3, respectively. Similarly, in the case that the minimum RLC PDU size is configured to be larger than 126 octets as NOTE 2, the processor 103 would segment the SDU S4 (which is too large to be filled into the second PDU) and fill the segmented SDU S4 into the second PDU to make the size of the packaged second PDU larger than the minimum RLC PDU size but less than the maximum RLC PDU size, especially approximate to the maximum RLC PDU size as far as possible. In addition, since ends of the SDUs S4, S5 are within the first 123 octets of the filled SDUs in the third PDU, the LI 1 and LI 2 of the third PDU are utilized to indicate their ends.

Figure 3D:
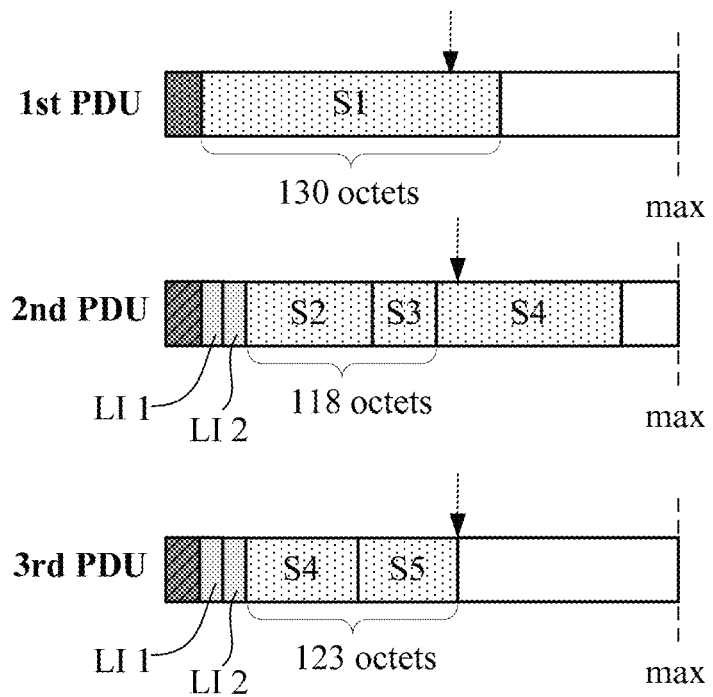

Additionally, FIG. 3D shows another exemplary implementation of the flexible PDU packaging in the UM mode, in which the alternative E-bit interpretation is configured. It shall be noted that the PDU header in the UM mode occupies 1 byte only; by contrast, the PDU header in the AMD occupies 2 octets. Thus, the minimum RLC PDU size in the UM mode would be configured to be larger than 125 octets in the light of NOTE 2, and the maximum RLC PDU size in the UM mode would be configured to be larger than 125 octets in the light of both NOTE 1 and NOTE 2. Since the exemplary implementation illustrated in FIG. 3D is similar with that shown in FIG. 3C, and those of ordinary skill in the art would appreciate how to package the PDU as shown in FIG. 3D based on the above descriptions, its detail will not be further described herein.

Figure 4:
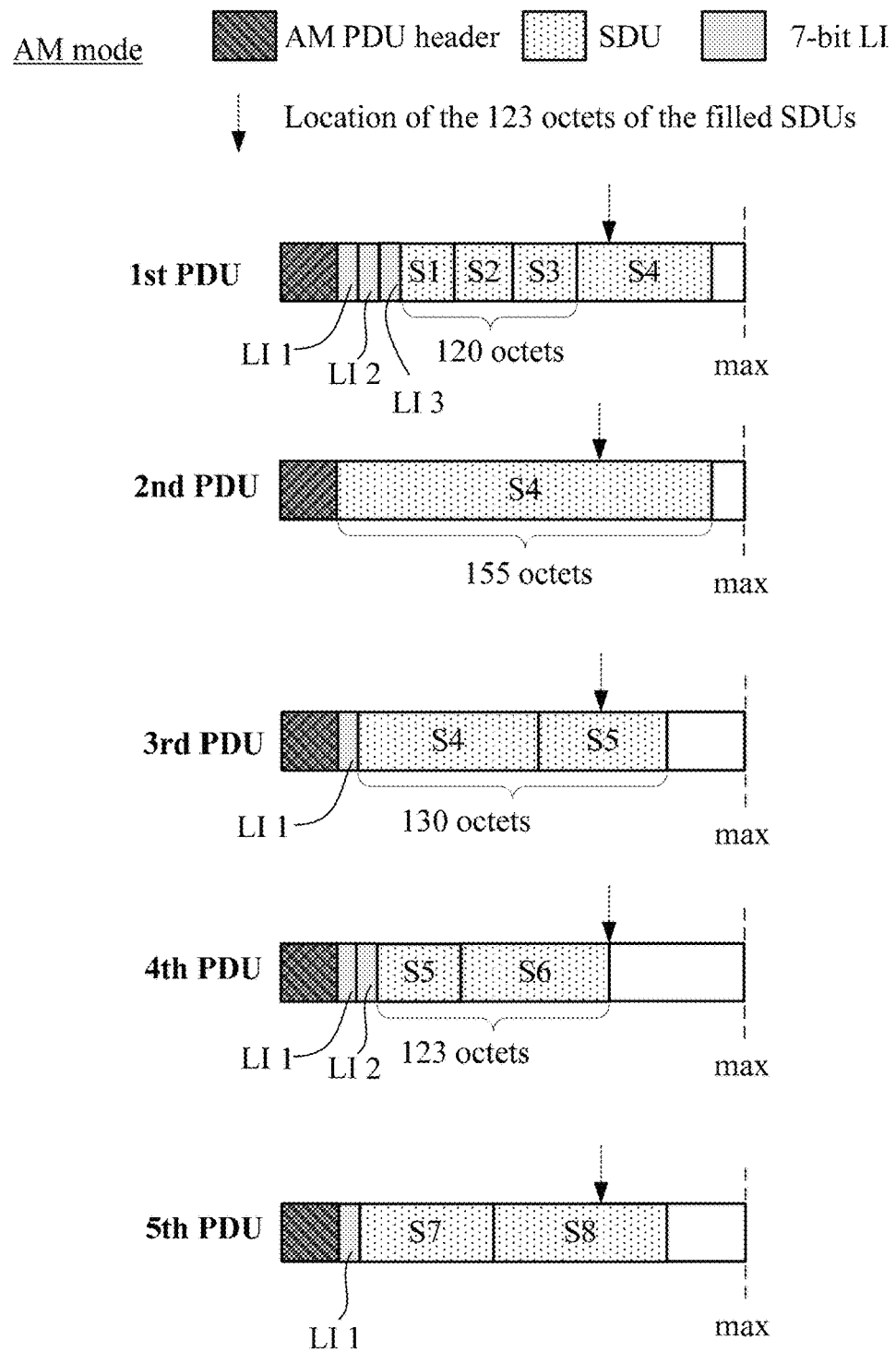
FIG. 4 is a schematic diagram illustrating an exemplary implementation of PDU packaging according to the second embodiment of the present invention.

The second embodiment of the present invention is depicted in FIGS. 1 and 4. Unlike the first embodiment, the UE 1 of this embodiment executes another flexible PDU packaging procedure. In detail, the processor 103 performs the flexible PDU packaging procedure of the second embodiment according to a system setting when the configuration information 102 configures the 7-bit LI size and the flexible PDU size. The system setting may also be indicated by the configuration information 102 or may be configured by the developer options menu in the operation system of the UE 1.

First, the processor 103 generates the RLC PDU and then fills the first SDU into the PDU. In this embodiment, the UE 1 of the present invention only uses the 7-bit LI to indicate an end of a SDU. Since the 7-bit LI can only indicate an end of a SDU at a maximum size of 123 octets, the first SDU to be filled may be: (i) a complete SDU with the SDU size smaller than or equal to 123 octets; (ii) a segmented SDU with the SDU size larger than 123 octets when the first SDU is not the last segment of its original SDU; (iii) a segmented SDU with the SDU size smaller than or equal to 123 octets when the first SDU is the last segment of its original SDU. In other words, the end of the first SDU cannot be located beyond the 123 octets of the filled SDU in the PDU.

In this embodiment, each time after the processor 103 fills a SDU into the PDU, the processor 103 would calculate an accumulated SDU size of the PDU and determine whether the accumulated SDU size is smaller than 123 octets. When the accumulated SDU size is smaller than 123 octets, the processor 103 further fills a next SDU into the PDU and won't make an end of the next SDU be located beyond the 123 octets of the filled SDU/SDUs in the PDU. That is, if an end of the next SDU will be located beyond the 123 octets of the filled SDU/SDUs in the PDU, it would be segmented so that only a part of the next SDU is filled into the PDU, and the remaining part of the next SDU will be filled into next one or more PDUs. In this way, the end of the last filled SDU would not be located beyond the first 123 octets of the filled SDU/SDUs in the PDU, which means that the end of the last filled SDU will be located within the first 123 octets of the filled SDU/SDUs in the later PDU (e.g., the next PDU). Therefore, each end of SDUs in each PDU can be indicated by the 7-bit LIs.

The processor 103 repeatedly executes the aforesaid steps (i.e., calculating the accumulated SDU size of the PDU, determining whether the accumulated SDU size is smaller than 123 octets, filling the next SDU into the PDU when the accumulated SDU size is smaller than 123 octets and an end of the next SDU is not located beyond 123 octets of the filled SDU/SDUs of the PDU) unless the accumulated SDU size is not smaller than 123 octets. It shall be noted that, in each PDU, an end of a last filled SDU is not located beyond 123 octets of the filled SDU/SDUs in the PDU.

Then, the processor 103 fills at least one 7-bit LI and a header into the PDU when the PDU includes the SDU and at least one the next SDU. That is, when there is an end of a SDU within the first 123 octets of filled the SDU/SDUs in the PDU, the UE 1 of the present invention would use the 7-bit LI to indicate the end. In other words, the number of the filled 7-bit LI depends on the amount of the end of the SDUs within the first 123 octets of the filled SDUs in the PDU. Finally, the processor 103 finishes packaging the PDU. Likewise, the UE 1 would continue to execute the second PDU packaging procedure if there is space for the UE 1 to generate RLC PDUs for transmission in the current transmission time interval (TTI) (i.e., on-the-fly generation) or pre-generate RLC PDUs for transmission in a later transmission time interval (TTI).

As shown in FIG. 4, SDUs S1, S2 and S3 are filled into the first PDU firstly. Since the accumulated SDU size of S1, S2 and S3 are only 120 octets, which is smaller than 123 octets, the processor 103 continues to fill SDU S4 into the first PDU. In this case, due to the large size of the SDU S4, the processor 103 segments the SDU S4 into several parts so as to use a part of the first PDU, the entire second PDU and a part of the third PDU to fill the SDU S4. It shall be noted that there is no 7-bit LI to be filled into the second PDU since there is no end of a SDU in the second PDU. Besides, the total packaged size of PDUs can be different as long as there is no end of a SDU located beyond the first 123 octets of the filled SDU/SDUs in each PDU.

Next, the processor 103 fills a 7-bit LI into the third PDU to indicate the end of the SDU S4, and continues to fill a SDU S5 into the third PDU and the fourth PDU. In the fourth PDU, since the ends of SDUs S5 and S6 are located within the first 123 octets of the filled SDUs in the fourth PDU, two LIs (i.e., LI 1 and LI 2) are utilized to indicate their ends.

In the fifth PDU, the SDU S7 is a complete SDU and the SDU S8 is a segmented SDU. Since there is only one end of the SDU S7 located within the first 123 octets of the filled SDUs in the fifth PDU, only one LI (i.e., LI 1 of the fifth PDU) is filled to indicate the end of the SDU S7. It shall be appreciated that, in this embodiment, the total SDU size of a packaged PDU can be equal to or larger than 123 octets as long as an end of a last filled SDU is not located beyond the first 123 octets of the filled SDU/SDUs in the PDU. For example, when the complete SDU S6 makes the PDU size of the fourth PDU equal to 123 octets exactly, the SDU S7 can be optionally segmented and filled into the fourth PDU based on the practice requirements.

In other embodiment, when there is a last SDU in the current PDU and the end of the last SDU end is located within the first 123 octets of the filled SDU/SDUs in the current PDU, instead of filling an LI to indicate the end of the last SDU in the current PDU, the processor 103 may set the exactly-filled flag as "true" so that there will be an exactly-filled LI filled into the next PDU to indicate the end of the last SDU in the current PDU.

Figure 5:
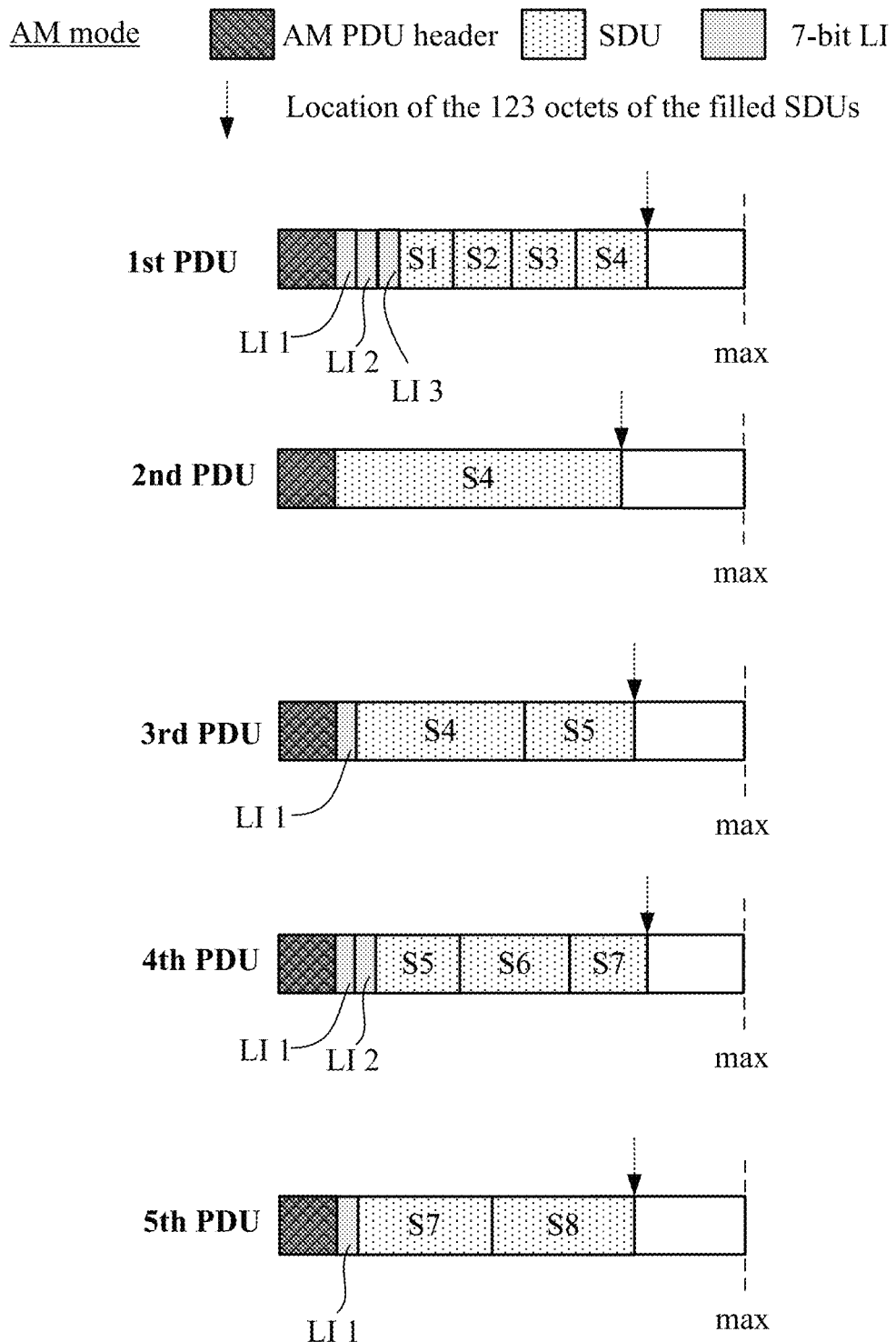
FIG. 5 is a schematic diagram illustrating another exemplary implementation of PDU packaging according to third embodiment of the present invention.

The third embodiment of the present invention is depicted in FIGS. 1 and 5. In this embodiment, the UE 1 packages PDUs with a fixed total SDU size of 123 octets. Specifically, the processor 103 executes a fixed PDU packaging procedure as described below.

The processor 103 determines whether the accumulated SDU size is smaller than 123 octets and fills the next SDU into the PDU when the accumulated SDU size is smaller than 123 octets. Accordingly, the processor 103 repeatedly executes the above steps until the accumulated SDU size is equal to 123 octets unless there is no next SDU being generated or needing to be generated. In other words, when the whole SDU to be filled into the PDU would make the accumulated SDU size be larger than 123 octets, the SDU would be segmented so as to make the total SDU size (i.e., the accumulated SDU size) of the packaged PDU be equal to 123 octets. For example, as shown in FIG. 5, each PDU is packaged with a total SDU size of 123 octets.

In other embodiment, when there is a last SDU in the current PDU and the end of the last SDU end is located at the 123 octets of the filled SDU/SDUs in the current PDU, instead of filling an LI to indicate the end of the last SDU in the current PDU, the processor 103 may set the exactly-filled flag as "true" so that there will be an exactly-filled LI filled into the next PDU to indicate the end of the last SDU in the current PDU.

Figure 6A:
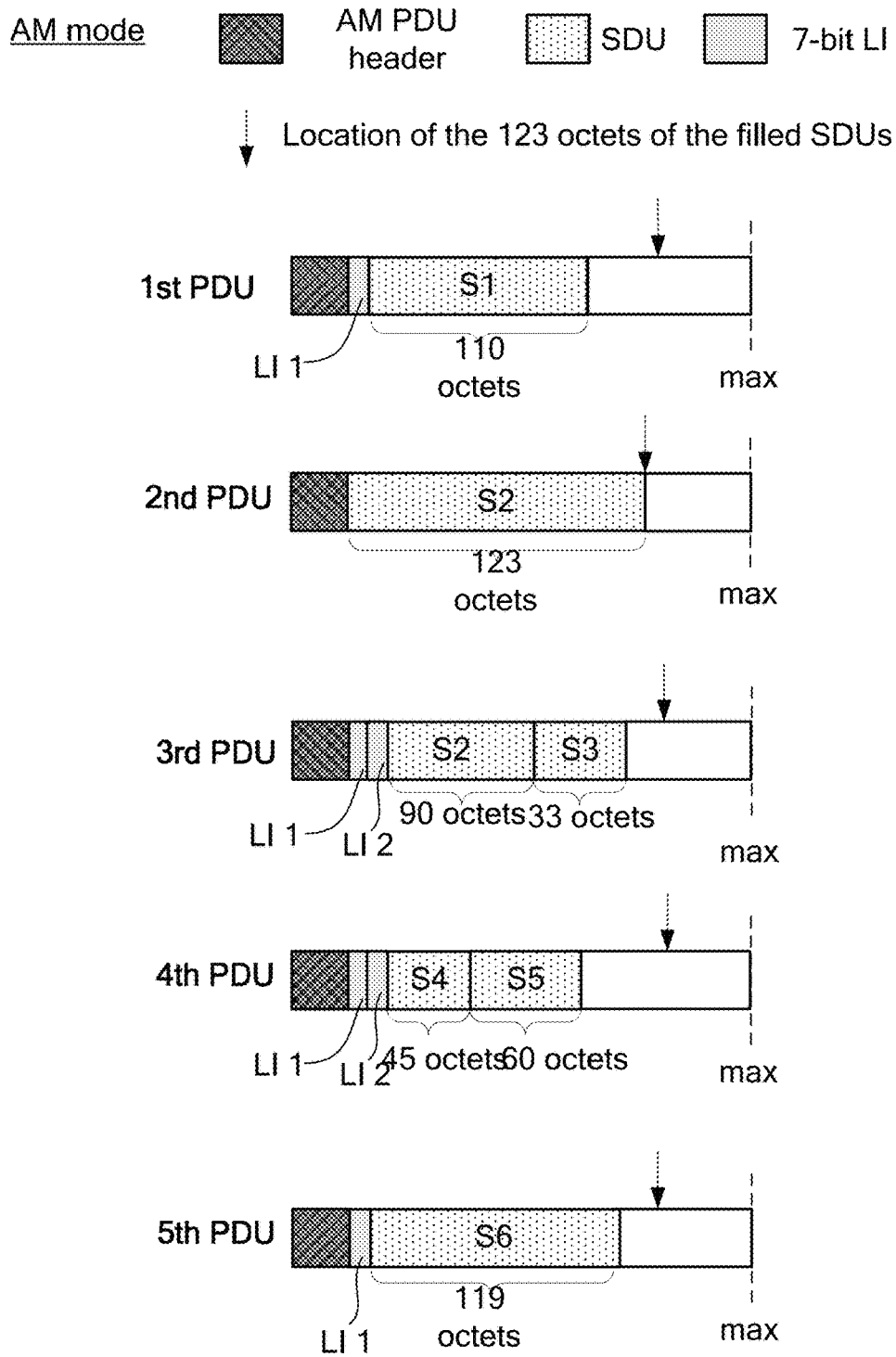
FIGS. 6A-6B are two schematic diagrams illustrating other exemplary implementations of PDU packaging, respectively, according to fourth embodiment of the present invention.
Figure 6B:
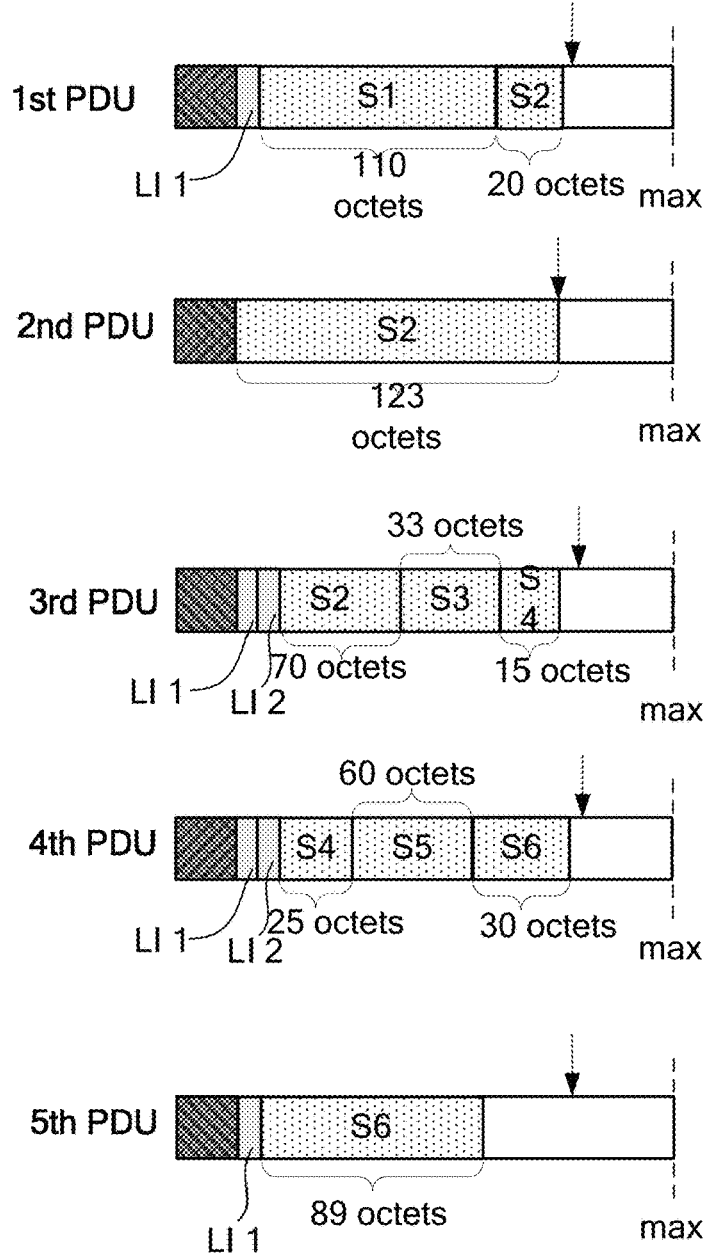

The fourth embodiment of the present invention is depicted in FIGS. 1 and 6A-6B. In this embodiment, the UE 1 packages PDUs with a flexible total SDU size, which is equal to or smaller than 123 octets. Specifically, the processor 103 executes another flexible PDU packaging procedure as described below.

First, the processor 103 generates the RLC PDU. Second, the processor 103 fills the SDU into the PDU. Since the UE 1 only uses the 7-bit LI to indicate an end of a SDU, the SDU will be segmented to have 123 octets or less than 123 octets when an original SDU of the SDU has more than 123 octets. In the best case scenario, the SDU would be segmented to have 123 octets so that the packaged PDU can carry much more data amount. Next, the processor 103 calculates the accumulated SDU size of the PDU, and determines whether the accumulated SDU size is smaller than 123 octets. When the accumulated SDU size is smaller than 123 octets and the next SDU to be filled won't make the accumulated SDU size of the PDU be larger than 123 octets, the processor 103 fills the next SDU into the PDU. The next SDU may be a complete or segmented SDU which won't make the accumulated SDU size of the PDU be larger than 123 octets after being filled. Optionally, the next SDU can be filled into a next newly generated PDU instead of the current PDU if its original SDU size will make the accumulated SDU size of the PDU be larger than 123 octets after being filled.

Likewise, the processor 103 would repeat the above steps (i.e., calculating the accumulated SDU size of the PDU, determining whether the accumulated SDU size is smaller than 123 octets, and filling the next SDU into the PDU when the accumulated SDU size is smaller than 123 octets and the next SDU does not make the accumulated SDU size be larger than 123 octets) unless the next SDU is a complete and optionally not filled into the PDU, or the next SDU is a segmented SDU. In addition, if there is no next SDU being generated or needing to be generated, the processor 103 will also stop repeating the above steps.

Next, the processor 103 fills at least one 7-bit LI into the PDU when the SDU is a last segment of the original SDU or the SDU is a complete SDU (which is not segmented, concatenated or padded), especially if the PDU further includes at least one the next SDU, and then fills a header into the PDU. As aforementioned, the number of the filled 7-bit LIs depends on how many ends of the SDUs there are within the first 123 octets of the SDUs. Accordingly, the processor 103 finishes packaging the PDU.

For example, as shown in FIG. 6A, the processor 103 optionally determines to fill a next newly generated PDU into the next PDU instead of the current PDU if the original SDU size of the next PDU would make the accumulated SDU size be larger than 123 octets. In this case, after a first SDU S1 with a 110-byte size is filled into the first PDU, the processor 103 can only allow a next SDU whose size is not larger than 13 octets (i.e., 123 octets minus 110 octets is 13 octets) to be filled into the first PDU. Under the circumstance, a second SDU S2 with 213-byte size would not be filled into the first PDU since its size is larger than 13 octets. Instead, the second SDU S2 would be segmented into two parts (i.e., the first segmented part of the second SDU S2 has 123 octets, and the second segmented part of the second SDU S2 has 90 octets) so that the first part and the second part of the second SDU S2 can be filled into a second PDU and a third PDU, respectively. Next, a third SDU S3 with a 33-byte size can also be filled into the third PDU since the filled third SDU S3 does not make the accumulated SDU size of the third PDU be larger than 123 octets.

Afterwards, a fourth SDU S4 with a 45-byte size and a fifth SDU S5 with a 60-byte size are filled into a fourth PDU. Then, a sixth SDU S6 with a 119-byte size is not allowed to be filled into the fourth PDU because its size is larger than 18 octets (i.e., 123 byes minus 105 octets is 18 octets), and therefore, the sixth SDU S6 will be filled into a next PDU (i.e., the fifth PDU). In addition, the processor 103 fills a 7-bit LI into the first PDU to indicate the end of the first SDU S1. Likewise, two 7-bit LIs (i.e., the first LI 1 and the second LI 2 of the third PDU) are used to indicate the ends of the second SDU S2 and the third SDU S3, respectively. And, two 7-bit LIs (i.e., the first LI 1 and the second LI 2 of the fourth PDU) are used to indicate the ends of the fourth SDU S4 and the fifth SDU S5, respectively. And, a 7-bit LI (i.e., the first LI 1 of the fifth PDU) is used to indicate the end of the sixth SDU.

In another example, as shown in FIG. 6B, the processor 103 optionally determines to fill part of the next newly generated PDU into the current PDU if the original SDU size of the next PDU will make the accumulated SDU size be larger than 123 octets. In this case, the processor 103 would segment the second SDU S2 and fill part of the second SDU S2 into the first PDU. Similarly, part of the fourth SDU S4 would be filled into the third PDU, and part of the sixth SDU S6 would be filled into the fourth PDU. It shall be noticed that the segmented size of the next SDU can be set based on the practical requirement and can be further adaptively adjusted; thus, it does not limit the present invention.

In other embodiment, when there is a last SDU in the current PDU and the end of the last SDU end is located within the first 123 octets of the filled SDU/SDUs in the current PDU, instead of filling an LI to indicate the end of the last SDU in the current PDU, the processor 103 may set the exactly-filled flag as "true" so that there will be an exactly-filled LI filled into the next PDU to indicate the end of the last SDU in the current PDU.

Figure 7:
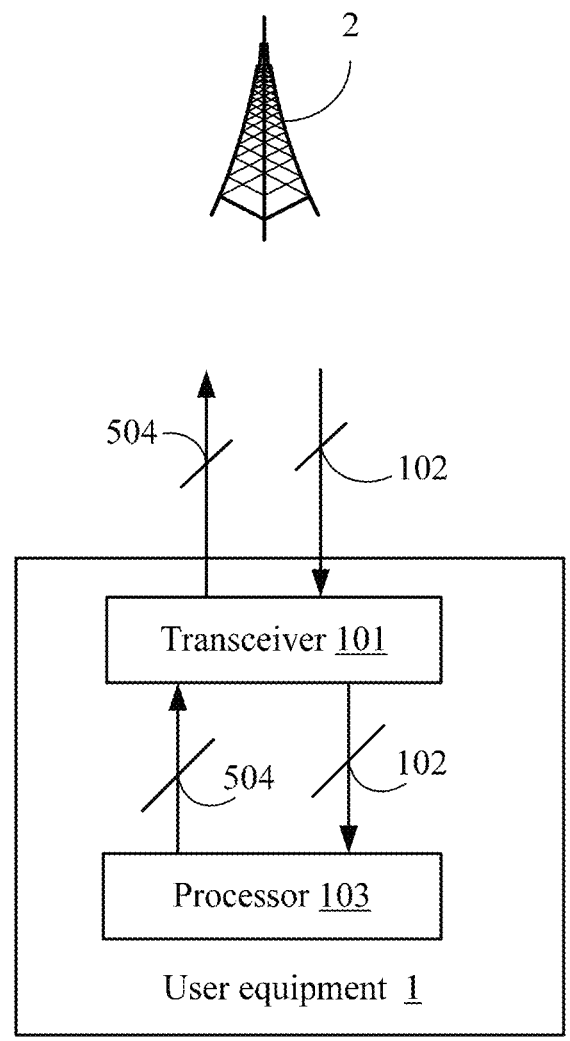
FIG. 7 is a schematic view of a user equipment 1 according to the fifth embodiment of the present invention.

Please refer to FIG. 7 for the fifth embodiment of the present invention. In this embodiment, when the configuration information 102 configures the 7-bit LI size and the flexible PDU size, the processor 103 would perform a disconnection procedure, instead of the aforementioned flexible or fixed PDU package procedures. To be more specific, the processor 103 in this embodiment further disables the flexible PDU package procedure and performs the disconnection procedure according to a system setting when the configuration information 102 configures the 7-bit LI size and the flexible PDU size. Similarly, the system setting may also be indicated by the configuration information 102 or may be configured by the developer options menu in the operation system of the UE 1.

In other words, once the UE 1 receives the configuration information 102 indicating that using the 7-bit LI size to indicate an end of a SDU in the flexible PDU size, the processor 103 in this embodiment would performs the disconnection procedure to transmit an invalid configuration message 504 to the base station 2. As a result, the connection between the base station 2 and the UE 1 would be disconnected.

Figure 8A:
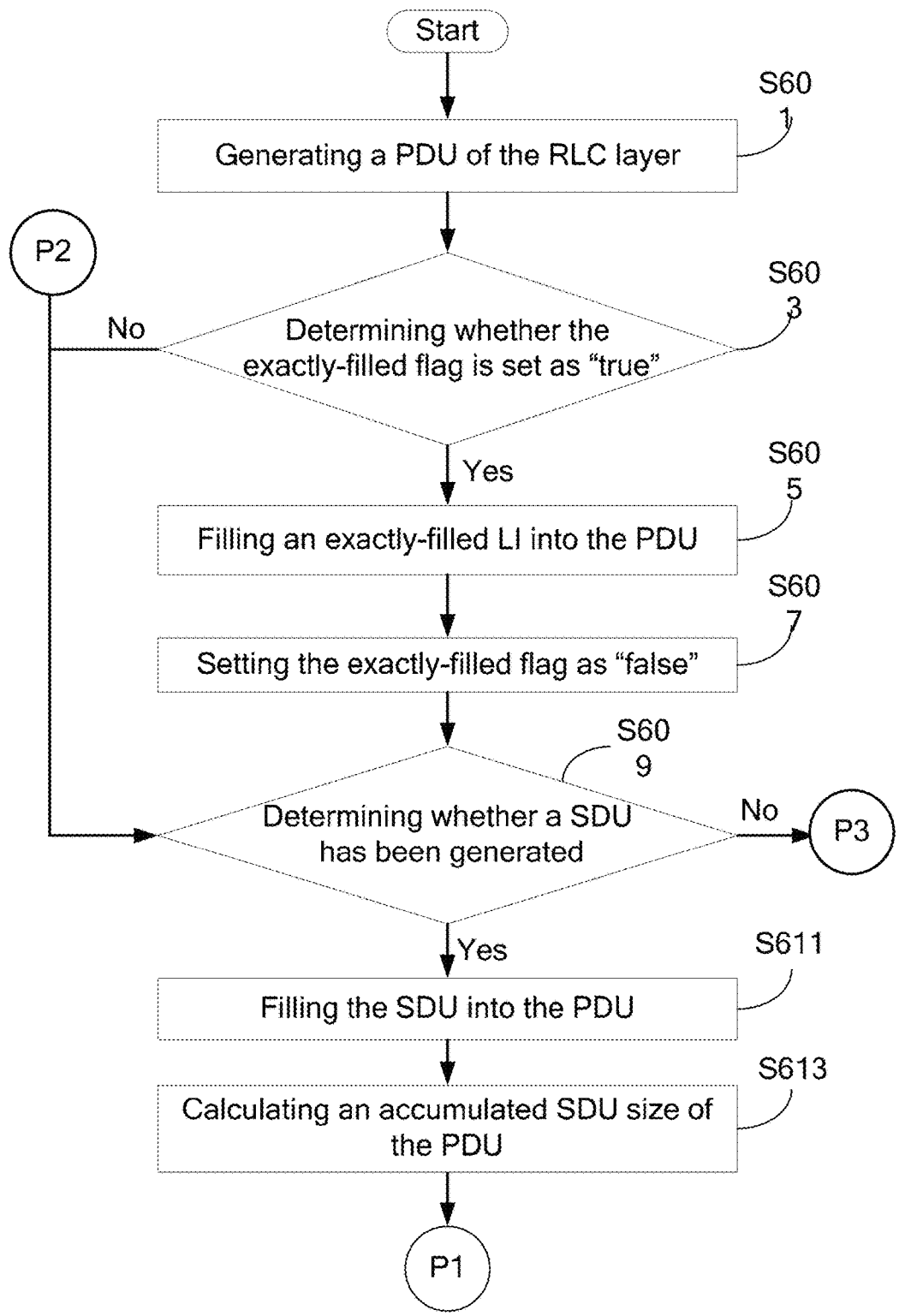
FIGS. 8A, 8B, 8C are flowchart diagrams of a flexible PDU packaging method according to the sixth embodiment of the present invention.
Figure 8B:
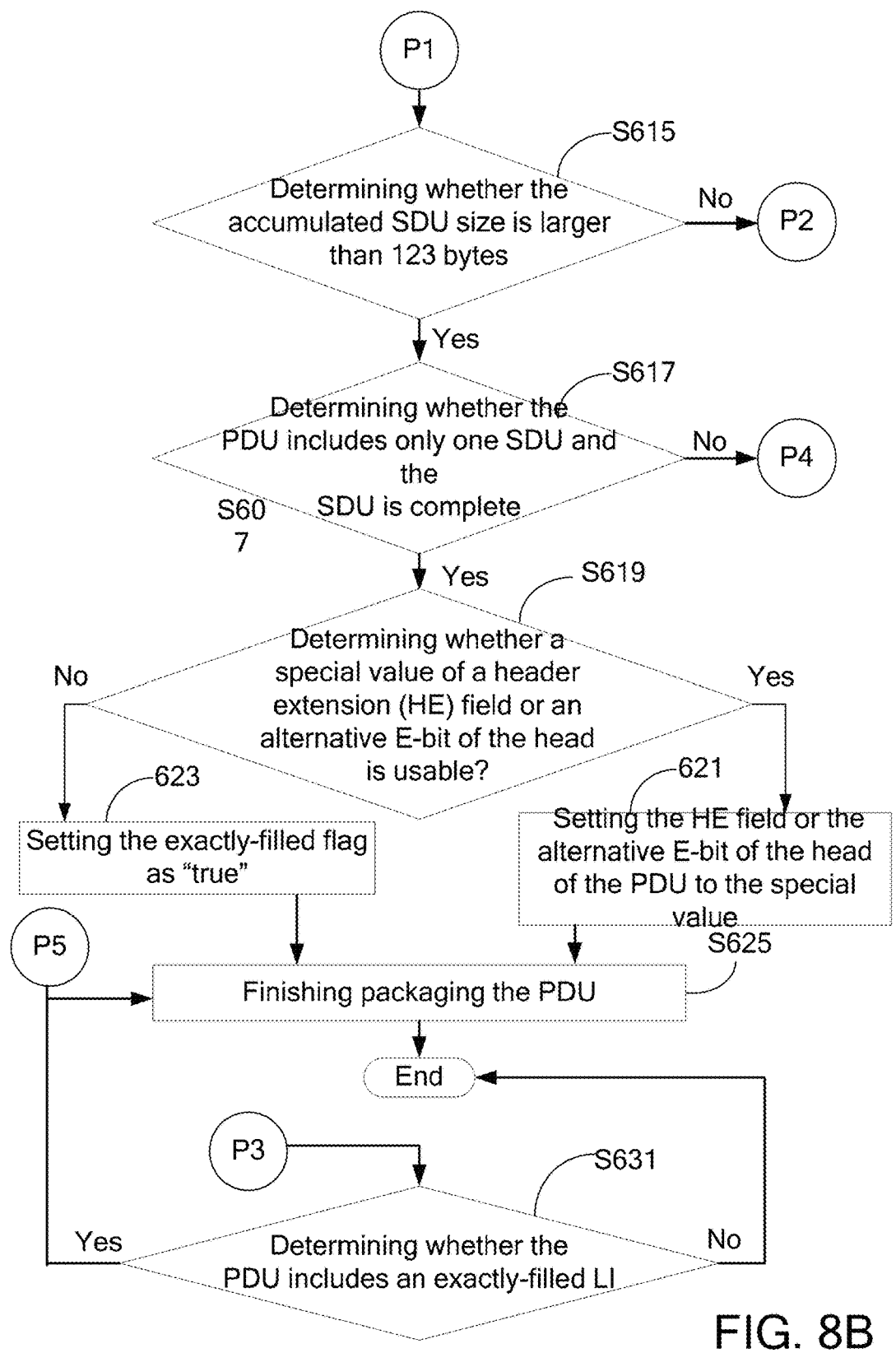
Figure 8C:
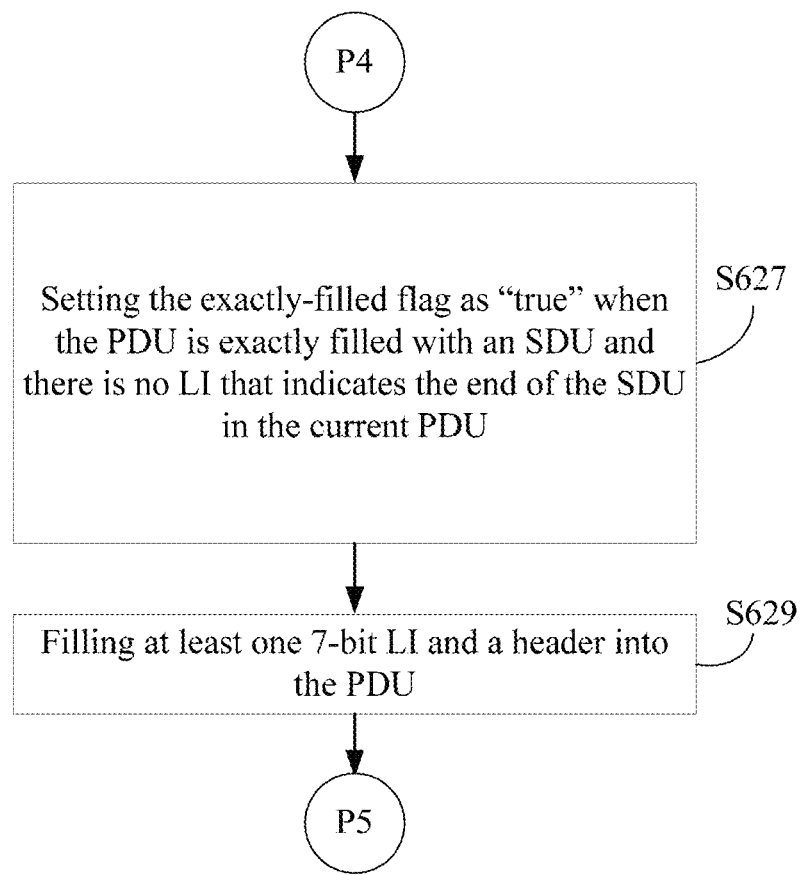

The sixth embodiment of the present invention is a flexible protocol data unit (PDU) packaging method, flowcharts of which are shown in FIGS. 8A, 8B, 8C. The flexible PDU packaging method in a radio link control (RLC) layer is for used in a user equipment, e.g., the UE 1 of the first embodiment. The UE comprises a transceiver and a processor electrically connected to the transceiver. The transceiver is configured to receive a configuration information from a base station. The PDU packaging method is executed by the processor when the configuration information configures a 7-bit length indicator (LI) size and a flexible PDU size. The procedure for the PDU packaging method corresponds to the first flexible package procedure as depicted in the first embodiments.

First, step S601 is executed to generate a PDU of the RLC layer. Next, step S603 is executed to determine whether the exactly-filled flag is set as "true". Then, step S605 is executed to fill an exactly-filled LI into the PDU to indicate an end of a SDU at the end of a previous one PDU when the exactly-filled flag is set as "true". After filling an exactly-filled LI into the PDU, step S607 is further executed to set the exactly-filled flag as "false" once the exactly-filled LI has been filled into the PDU.

It should be noted that the default exactly-filled flag is set as "false" at the beginning of the flexible PDU packaging procedure because there is no one PDU which has been packaged. In this case, the processor executes step S609 directly (instead of steps S605 and S607) to determine whether a SDU has been generated. If the determination result is "Yes" in step S609, then step S611 is executed to fill a service data unit (SDU) into the PDU.

After filling the generated SDU into the PDU, step S613 is executed to calculate an accumulated SDU size of the PDU, and step S615 is further executed to determine whether the accumulated SDU size is larger than 123 octets. If the accumulated SDU size is not larger than 123 octets, then step S609 is executed again to determine whether a new SDU has been generated and step S611 consequently is executed to fill the newly generated SDU into the PDU. That is, step S609 to step S615 would be repeatedly executed until the accumulated SDU size is larger than 123 octets or there is no new SDU being generated. It shall be understood that the accumulated SDU size of the PDU means the total size of the filled SDUs in the PDU, and the finished packaged PDU size should be smaller than or equal to a maximum RLC PDU size defined in the configuration information. More specifically, in this embodiment, once the currently filled SDU (which might be a complete or segmented SDU) makes the accumulated SDU size of the PDU exceed 123 octets, the process would not fill the next SDU into the PDU.

After the accumulated SDU size is larger than 123 octets, step S617 is executed to determine whether the PDU includes only the SDU and the SDU is a complete SDU. If the determination result is "Yes" in step S617, then step S619 is further executed to determine whether a special value of a header extension (HE) field or an alternative E-bit of the header is usable. If the determination result is "Yes" in step S619, then step S621 is executed to set the HE field or the alternative E-bit of the header of the PDU the special value.

As described in the first embodiments, the header extension HE field is set to a special value (e.g., "10") to indicate the SDU is a complete SDU if the UTRAN has configured "Use special value of HE field" (hereinafter also called "special HE"); otherwise, the alternative E-bit of the header of the PDU is set to a special value (e.g., "0") to indicate the SDU is a complete SDU if the UTRAN has configured "Alternative E-bit interpretation". By contrast, if the determination result is "NO" in step S619, then step S623 is executed to set the exactly-filled flag as "true". After step S621 or S623, step S621 is execute to finish packaging the PDU, and the procedure of the PDU packaging method ends up.

When the PDU includes not only one SDU and/or the SDU is not a complete SDU in step S617, step S627 is executed. In detail, step S627 will be executed to set the exactly-filled flag as "true" when the PDU is exactly filled with an SDU and there is no LI that indicates the end of the SDU in the current PDU. For example, the PDU may include the SDU and at least one the next SDU (i.e., more than one SDU) and each of the at least one the next SDU is a complete SDU. In another example, the PDU may include only the SDU and the SDU is a last segment of an original SDU. In other words, if the PDU includes more than one filled SDUs and the last one filled SDU is a complete SDU (which means there is an end of the last filled SDU at the end of the PDU), or if the PDU includes only one SDU which is the last segment of its original SDU, the exactly-filled flag would be set as "true" so that an exactly-filled LI will be filled into the next PDU (i.e., steps S603-607) so as to indicate an end of a last filled SDU in this PDU. Then, step S629 is executed to fill at least one 7-bit LI and a header into the PDU. Consequently, one PDU packaging is finished (i.e., step S625), and the procedure of the PDU packaging method ends up.

On the other hand, in step S609, if the SDU has not been generated (i.e. there is no new SDU being generated), the processor executes step S631 to determine whether the PDU includes an exactly-filled LI. If the determination result is "Yes" in S631, then step 625 is executed to finish packaging the PDU and then the procedure of the PDU packaging method ends up. Besides, in S629, if the PDU does not include an exactly-filled LI (that means there is no information required to be transmitted), then the procedure of the PDU packaging method ends up.

It shall be appreciated that the procedure of the flexible PDU packaging method as depicted above will be performed repeatedly if there is space for the UE to generate RLC PDUs for transmission in the current transmission time interval (TTI) (i.e., on-the-fly generation) or pre-generate RLC PDUs for transmission in a later transmission time interval (TTI). In addition to the aforesaid steps, the flexible PDU packaging method of the present invention can also execute all the operations and corresponding functions set forth in the first embodiment. How to execute these operations and functions will be readily appreciated by those of ordinary skill in the art based on the explanation of the first embodiment, and thus, will not be further described herein.

According to the above descriptions, the PDU packaging mechanism of the present invention uses an exactly-filled LI, a special HE, or an alternative E-bit to indicate an end of a SDU located beyond the first 123 octets of the filled SDU/SDUs in a PDU when a UE is configured to use 7-bit sized LIs to indicate the end of SDUs in flexible sized PDUs. In addition, the UE of the present invention can also use a flexible/fixed PDU package mechanism to only use the 7-bit LI to indicate ends of SDUs. Alternatively, the UE of the present invention may perform a disconnection procedure when it is configured to use 7-bit sized LIs to indicate the end of SDUs in flexible sized PDUs. Therefore, the PDU package mechanism of the present invention clearly defines the UE's behavior when the UE is configured to utilize 7-bit sized LIs to indicate the end of SDUs in flexible sized PDUs.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A user equipment comprising:
    a transceiver, being configured to receive configuration information from a base station;
    a processor, electrically connected to the transceiver, being configured to perform a flexible protocol data unit (PDU) packaging procedure in a radio link control (RLC) layer when the configuration information configures a 7-bit length indicator (LI) size and a flexible PDU size, wherein the flexible PDU packaging procedure comprises the following steps:
        (a) generating a PDU of the RLC layer;
        (b) filling a service data unit (SDU) into the PDU;
        (c) calculating an accumulated SDU size of the PDU;
        (d) determining whether the accumulated SDU size is larger than 123 octets;
        (e) filling a next SDU into the PDU when the accumulated SDU size is not larger than 123 octets;
        (f) repeating the steps (c) to (e) until the accumulated SDU size is larger than 123 octets;
        (g) after the step (f), determining whether the PDU includes only the SDU and the SDU is a complete SDU;
        (h) setting a header extension (HE) field or an alternative E-bit of a header of the PDU to a special value to indicate the SDU is the complete SDU when the PDU includes only the SDU and the SDU is the complete SDU if the configuration information configures a special HE or an alternative E-bit interpretation; and
        (i) finishing packaging the PDU.

2. The user equipment as claimed in claim 1, wherein the step (b) further comprises the following steps:
    determining whether the SDU has been generated;
    filling the SDU into the PDU when the SDU has been generated; and
    ending up the flexible PDU packaging procedure when the SDU has not been generated.

3. The user equipment as claimed in claim 2, wherein the step (e) further comprises the following steps:
    determining whether the next SDU has been generated;
    filling the next SDU into the PDU when the next SDU has been generated; and
    finishing packaging the PDU and ending up the flexible PDU packaging procedure when the next SDU has not been generated.

4. The user equipment as claimed in claim 1, wherein after the step (f), the flexible PDU packaging procedure further comprises the following steps:
    setting an exactly-filled flag as true when the PDU includes the SDU and at least one the next SDU and each of the at least one the next SDU is a complete SDU;
    filling at least one 7-bit LI and a header into the PDU; and
    finishing packaging the PDU.

5. The user equipment as claimed in claim 1, wherein after the step (f), the flexible PDU packaging procedure further comprises the following steps:
   setting an exactly-filled flag as true when the PDU includes only the SDU and the SDU is a last segment of an original SDU;
   finishing packaging the PDU.

6. The user equipment as claimed in claim 1, wherein after the step (h), the flexible PDU packaging procedure further comprises the following steps:
   setting an exactly-filled flag as true when the PDU includes only the SDU and the SDU is the complete SDU if the configuration information does not configure the special HE or the alternative E-bit interpretation.

7. The user equipment as claimed in claim 1, wherein before step (b), the flexible PDU packaging procedure further comprises the following steps:
   determining whether an exactly-filled flag is set as true;
   filling an exactly-filled LI into the PDU when the exactly-filled flag is set as true; and
   setting the exactly-filled flag as false once the exactly-filled LI has been filled into the PDU.

8. A user equipment comprising:
   a transceiver, being configured to receive configuration information from a base station;
   a processor, electrically connected to the transceiver, being configured to performs a flexible PDU packaging procedure according to a system setting when the configuration information configures a 7-bit LI size and a flexible PDU size, and the flexible PDU packaging procedure comprises the following steps:
   (a) generating a PDU of the RLC layer;
   (b) filling an SDU into the PDU, wherein the SDU is a complete SDU with a SDU size of the SDU being smaller than or equal to 123 octets, or the SDU is a segmented SDU with the SDU size being larger than 123 octets if the SDU is not a last segment of an original SDU of the SDU or with the SDU size being smaller than or equal to 123 if the SDU is the last segment of an original SDU;
   (c) calculating an accumulated SDU size of the PDU;
   (d) determining whether the accumulated SDU size is smaller than 123 octets;
   (e) filling a next SDU into the PDU when the accumulated SDU size is smaller than 123 octets, wherein the next SDU is a segmented SDU when an original SDU of the next SDU makes the accumulated SDU size be larger than 123 octets;
   (f) repeating the steps (c) to (e) unless the accumulated SDU size is not smaller than 123 octets;
   (g) after the step (f), filling at least one 7-bit LI into the PDU when the next SDU is filled into the PDU, and filling a header into the PDU; and
   (h) finishing packaging the PDU.

9. A user equipment comprising:
   a transceiver, being configured to receive configuration information from a base station;
   a processor, electrically connected to the transceiver, being configured to perform a fixed PDU packaging procedure according to a system setting when the configuration information configures a 7-bit LI size and a flexible PDU size, and the fixed PDU packaging procedure comprises the following steps:
   (a) generating a PDU of the RLC layer;
   (b) filling an SDU into the PDU, wherein the SDU is a segmented SDU having 123 octets when an original SDU of the SDU has more than 123 octets;
   (c) calculating an accumulated SDU size of the PDU;
   (d) determining whether the accumulated SDU size is smaller than 123 octets;
   (e) filling a next SDU into the PDU when the accumulated SDU size is smaller than 123 octets, wherein the next SDU is a segmented SDU and makes the accumulated SDU size be equal to 123 octets, or the next SDU is a complete SDU and does not make the accumulated SDU size be larger than 123 octets;
   (f) repeating the steps (c) to (e) until the accumulated SDU size is equal to 123 octets;
   (g) after the step (f), filling at least one 7-bit LI into the PDU when the next SDU is filled into the PDU, and filling a header into the PDU; and
   (h) finishing packaging the PDU.

10. A user equipment comprising:
    a transceiver, being configured to receive configuration information from a base station;
    a processor, electrically connected to the transceiver, being configured to perform a flexible PDU packaging procedure according to a system setting when the configuration information configures a 7-bit LI size and the flexible PDU size, and a second flexible PDU packaging procedure comprises the following steps:
    (a) generating a PDU of the RLC layer;
    (b) filling an SDU into the PDU, wherein the SDU is a segmented SDU having 123 octets or less than 123 octets when an original SDU of the SDU has more than 123 octets;
    (c) calculating an accumulated SDU size of the PDU;
    (d) determining whether the accumulated SDU size is smaller than 123 octets;
    (e) filling a next SDU into the PDU when the accumulated SDU size is smaller than 123 octets and the next SDU does not make the accumulated SDU size be larger than 123 octets, wherein the next SDU is a complete SDU or a segmented SDU;
    (f) repeating the steps (c) to (e) unless the next SDU is a complete SDU and is not filled into the PDU in the step (e) or the next SDU is a segmented SDU and has been filled in the step (e);
    (g) after the step (f), filling at least one 7-bit LI into the PDU when the next SDU is filled into the PDU, and filling a header into the PDU; and
    (i) finishing packaging the PDU.

11. A user equipment comprising:
    a transceiver, being configured to receive configuration information from a base station;
    a processor, electrically connected to the transceiver, being configured to performs a disconnection procedure according to a system setting when the configuration information configures a 7-bit LI size and a flexible PDU size, and the disconnection procedure comprises the following step:
    transmitting an invalid configuration message to the base station.

12. A flexible protocol data unit (PDU) packaging method in a radio link control (RLC) layer, the PDU packaging method being for used in a user equipment, the user equipment comprising a transceiver and a processor electrically connected to the transceiver, the transceiver being configured to receive a configuration information from a base station, and the PDU packaging method being executed by the processor when the configuration information configures a 7-bit length indicator (LI) size and a flexible PDU size and comprising the following steps:

(a) generating a PDU of the RLC layer;
(b) filling a service data unit (SDU) into the PDU;
(c) calculating an accumulated SDU size of the PDU;
(d) determining whether the accumulated SDU size is larger than 123 octets;
(e) filling a next SDU into the PDU when the accumulated SDU size is not larger than 123 octets;
(f) repeating the steps (c) to (e) until the accumulated SDU size is larger than 123 octets;
(g) after the step (f), determining whether the PDU includes only the SDU and the SDU is a complete SDU;
(h) setting a header extension (HE) field or an alternative E-bit of the header of the PDU to a special value to indicate the SDU is the complete SDU when the PDU includes only the SDU and the SDU is the complete SDU if the configuration information configures a special HE or an alternative E-bit interpretation; and
(i) finishing packaging the PDU.

13. The flexible PDU packaging method as claimed in claim 12, wherein the step (b) further comprises the following steps:
determining whether the SDU has been generated;
filling the SDU into the PDU when the SDU has been generated; and
ending up the flexible PDU packaging procedure when the SDU has not been generated.

14. The flexible PDU packaging method as claimed in claim 13, wherein the step (e) further comprises the following steps:
determining whether the next SDU has been generated;
filling the next SDU into the PDU when the next SDU has been generated; and
finishing packaging the PDU and ending up the flexible PDU packaging procedure when the next SDU has not been generated.

15. The flexible PDU packaging method as claimed in claim 12, wherein after the step (f), the flexible PDU packaging method further comprises the following steps:
setting an exactly-filled flag as true when the PDU includes the SDU and at least one the next SDU and each of the at least one the next SDU is a complete SDU;
filling at least one 7-bit LI and a header into the PDU; and
finishing packaging the PDU.

16. The flexible PDU packaging method as claimed in claim 12, wherein after the step (f), the flexible PDU packaging method further comprises the following steps:
setting an exactly-filled flag as true when the PDU includes only the SDU and the SDU is a last segment of an original SDU;
finishing packaging the PDU.

17. The flexible PDU packaging method as claimed in claim 12, wherein after the step (h), the flexible PDU packaging procedure further comprises the following steps:
setting an exactly-filled flag as true when the PDU includes only the SDU and the SDU is the complete SDU if the configuration information does not configure the special HE or the alternative E-bit interpretation.

18. The flexible PDU packaging method as claimed in claim 12, wherein before step (b), the flexible PDU packaging method further comprises the following steps:
determining whether an exactly-filled flag is set as true;
filling an exactly-filled LI into the PDU when the exactly-filled flag is set as true; and
setting the exactly-filled flag as false once the exactly-filled LI has been filled into the PDU.

* * * * *